United States Patent [19]

Murakami

[11] Patent Number: 5,107,376
[45] Date of Patent: Apr. 21, 1992

[54] MUTUALLY AND REPEATEDLY REPRODUCIBLE INFORMATION RECORDING MEDIUM AND METHOD FOR PREPARING THE SAME

[76] Inventor: Miki Murakami, No. 9-4, Nishinogawa 1-chome, Komae-shi, Tokyo, Japan

[21] Appl. No.: 614,015

[22] Filed: Nov. 14, 1990

Related U.S. Application Data

[63] Continuation of Ser. No. 479,187, Feb. 9, 1990, abandoned, which is a continuation of Ser. No. 394,235, Aug. 14, 1989, abandoned, which is a continuation of Ser. No. 144,317, Jan. 14, 1988, abandoned.

[30] Foreign Application Priority Data

Jan. 19, 1987 [JP] Japan .................. 62-008093

[51] Int. Cl.$^5$ .......................... G41B 5/02; G41B 15/12
[52] U.S. Cl. ................................... 360/622; 360/63
[58] Field of Search ........................ 360/22, 63

[56] References Cited

U.S. PATENT DOCUMENTS 3,587,180  6/1971  Richt ........................... 360/74.4
4,270,152  5/1981  Ida .............................. 360/74.4

FOREIGN PATENT DOCUMENTS 1622060 12/1969 Fed. Rep. of Germany .
2442438  3/1976 Fed. Rep. of Germany .
1595950  2/1977 United Kingdom .

OTHER PUBLICATIONS

European Search Report-88100627.4.

*Primary Examiner*—Vincent P. Canney
*Attorney, Agent, or Firm*—Rosen, Dainow & Jacobs

[57] ABSTRACT

A mutually and repeatedly reproducible information recording medium, and method for preparing the same, prepared by forming first blocks, adjacent to each other and spaced by space sections, comprising first information on one track of the information recording medium, and forming second blocks comprising second information arranged in the reverse flow direction of information on the other track, so that parts of the other tracks corresponding to the start points of the individual first or second blocks on the one track are always space sections, in which one block of the first or second information is reproduced and, after the reproduction of the block is complete, the information recording medium is run in the reverse direction to reproduce the other track, thereby reproducing the second or first information corresponding to the previously reproduced information.

7 Claims, 6 Drawing Sheets

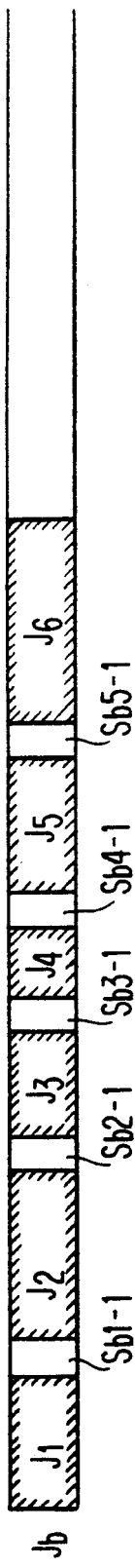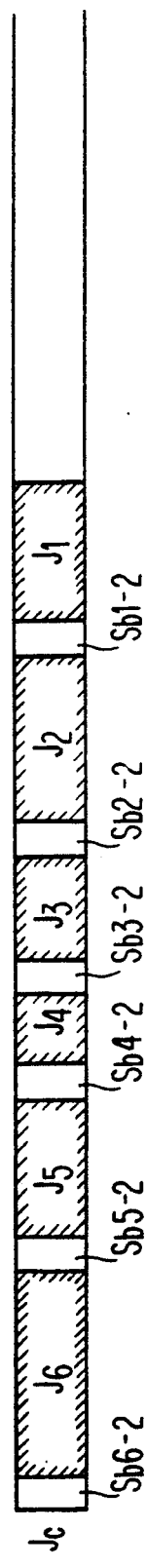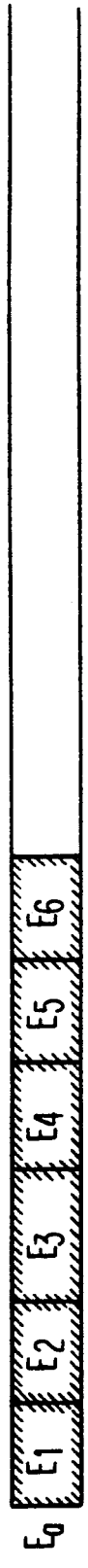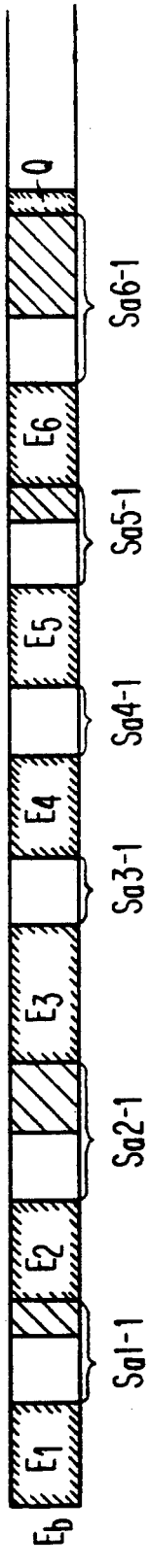

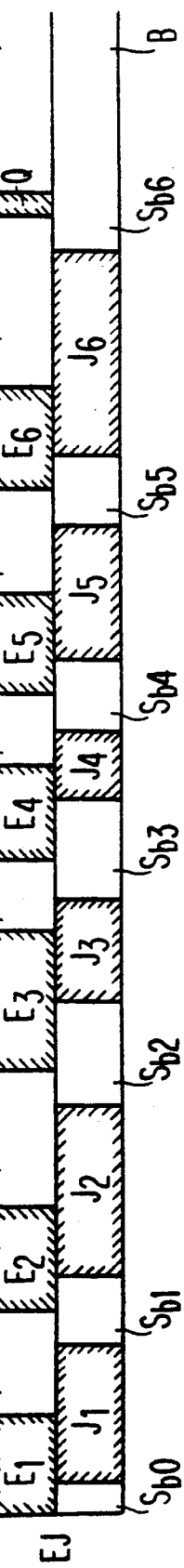

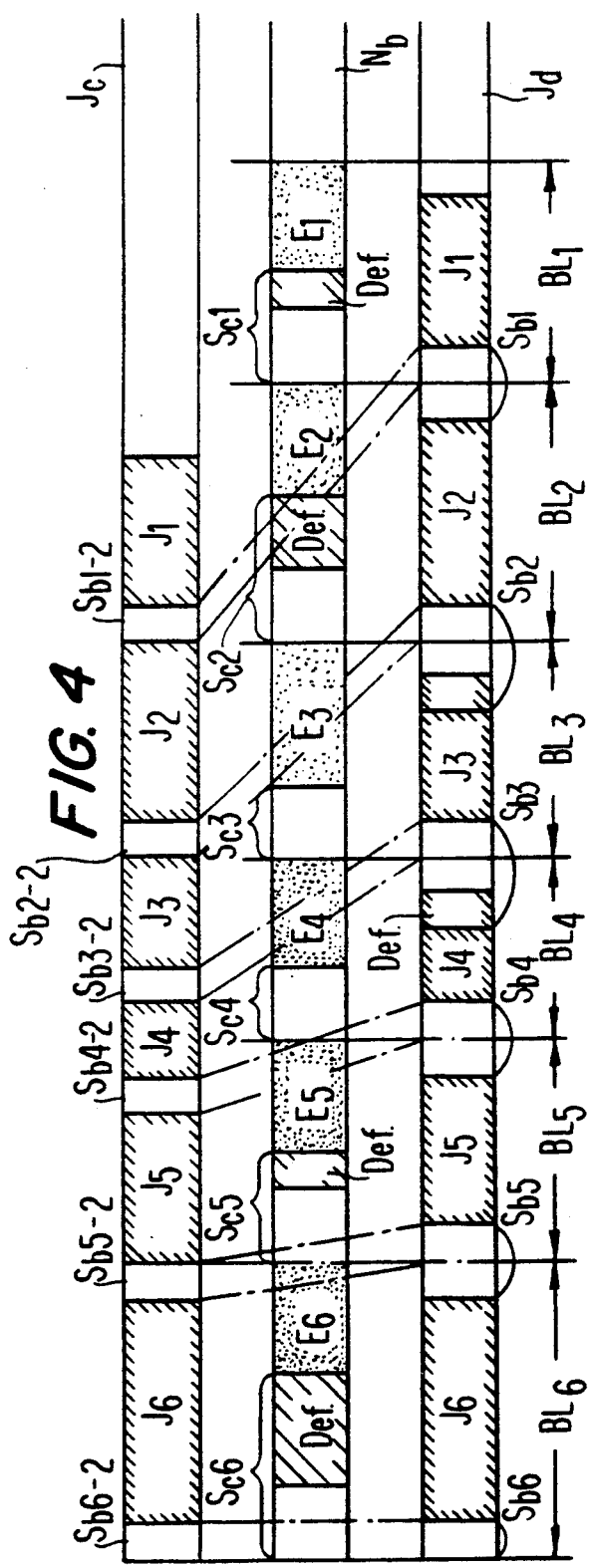

MUTUALLY AND REPEATEDLY REPRODUCIBLE INFORMATION RECORDING MEDIUM AND METHOD FOR PREPARING THE SAME

This invention is a continuation of application Ser. No. 479,187, filed Feb. 9, 1990, now abandoned, which is a continuation of application Ser. No. 394,235, filed Aug. 4, 1989, now abandoned, which is a continuation of application Ser. No. 144,317, filed Jan. 14, 1988, now abandoned.

DETAILED DESCRIPTION OF THE INVENTION

This invention relates to a mutually and repeatedly reproducible information recording medium and a method for preparing the same, which allows a first information and a second information corresponding to each other, such as English and its Japanese translation, to be reproduced easily and repeatedly.

2. Background of the Invention

Recently a method for learning English conversation by listening to a cassette tape is widely used in recent days with the popularization of cassette tape recorders as a consumer product. In this case, the recording surface of the cassette tape is configured, for example, as shown in FIG. 10. On the recording surface of a cassette tape ej, English sound signals (hereinafter simply referred to as English) $e_1$–$e_6$ and Japanese sound signals (hereinafter simply referred to as Japanese) $j_1$–$j_6$, which are translations corresponding to the English, are alternately formed on a single track.

When the above-described cassette tape ej is reproduced to learn English conversation, there is a case where the same location of English $e_1$–$e_6$ and the corresponding part of Japanese $j_1$–$j_6$ are to be heard repeatedly. For example, when the English $e_3$ and the Japanese $e_3$ are to be heard repeatedly, the cassette tape ej must be rewound to the English $e_3$, and then the English $e_3$ and the Japanese $j_3$ heard again. Therefore, a troublesome manipulation of the cassette tape recorder is required associated with the repeated listening.

In addition, even when translations corresponding to the heard and understood English $e_1$–$e_6$ are not necessary to hear, and the Japanese $j_1$–$j_6$ are to be skipped to hear the English $e_1$–$e_6$ of the next block, the block of the Japanese $j_1$–$j_6$ must be passed through by a quick forward at best. Even if the tape is fed forward quickly, it is difficult to locate the next English $e_1$–$e_6$ adequately.

Further, for the case where any of the Japanese $j_1$–$j_6$ is heard and then the corresponding part of the English $e_1$–$e_6$ is to be heard, the manipulation of the cassette tape recorder is much more complex than the case from the English $e_1$–$e_6$ to the Japanese $j_1$–$j_6$.

As described above, the prior art cassette tape ej has had many problems to be solved when to be used for learning English conversation efficiently.

OBJECT AND SUMMARY OF THE INVENTION

With a view to eliminate all of the prior art problems, it is a primary object of the present invention to provide a mutually and repeatedly reproducible information recording medium, and a method for preparing the same, which allows necessary parts of a plurality of combinations of first information and second information corresponding to each other, such as English and its Japanese translation, to be reproduced easily and repeatedly.

In accordance with the present invention which attains the above object, there is provided a mutually and repeatedly reproducible information recording medium such as a magnet tape in which, by running in one direction, first information such as an English sound signal recorded on one track and, by running in the reverse direction, second information recorded on the other track such as a Japanese sound signal of the translation of the English sound signal corresponding to the first information, characterized in that:

(a) each of the one track and the other track has a plurality of blocks where information is recorded, and space sections are provided between adjacent blocks on the same track where no information is recorded, (b) parts of the other track corresponding to starting positions of individual blocks on the one track and parts of the one track corresponding to starting positions of individual blocks on the other track are space sections, and (c) the space sections in (b) are space sections located immediately after blocks recorded with information corresponding to each other with respect to individual running directions for reproducing the information recording medium.

There is also provided according to the present invention a method for preparing a mutually and repeatedly reproducible information recording medium comprising:

(a) forming a plurality of preparing a second information recording medium by forming a plurality of successive blocks and dubbing second information from a first information recording medium so as to form first space sections where no information is recorded between adjacent blocks of the second information recorded adjacent blocks of the second information recorded on the first information recording medium.

(b) preparing a third information recording medium having second space sections between adjacent blocks and where blocks are arranged in the reverse direction, by rewinding the second information recording medium from the rear side to the front side of each block and then reproducing each block and dubbing each reproduced sound, (c) preparing a fifth information recording medium by dubbing first information from a fourth information recording medium so as to form a plurality of successive blocks in the order corresponding to the second information and form third space sections where no information is recorded between adjacent blocks of the first information recorded on the fourth information recording medium, and forming after completion of the last block a specified third space section and then a reference point.

Comparing length of each block of the second information with that of each block of the first information, the third space section is formed so that when the second information ¢ the first information, two space sections satisfying following conditions (c-1) and (c-2) are formed, or otherwise one space section satisfying the condition (c-1) is formed:

(c-1) a space section having a length longer than the second space sections formed before and after each corresponding block of the third information recording medium;

(c-2) subtracting the length of each block of the third information recording medium by the length of each corresponding block of the fifth information recording medium and when the result being positive, space sections having a length added with a difference between both;

(d) based on position information on relative positions of a reference position and individual blocks when the reference position and the blocks of the fifth information recording medium are arranged in the reverse order, preparing a sixth information recording medium having fourth space sections between adjacent blocks by starting reproduction of the third information recording medium of the reference point and the end of each block, interrupting the reproduction at the end of each block of the third information recording medium, starting reproduction of the third information recording medium and dubbing of the second space sections and the second information, and then continuing dubbing with continued recording operation, and (e) dubbing information of the sixth information recording medium with the fourth space sections onto another track of the fifth information recording medium in the reverse direction starting from the reference point of the fifth information recording medium.

With the above-described arrangement of the present invention, after completing reproduction of one information block of the first information recorded on one track and reversing onto another track at the beginning of the next information block on said one track, the second information corresponding to said first information reproduced. After completing the reproduction of one information block of said second information corresponding to said first information and reversing again at the beginning of the next information block, on said another track, the first information corresponding to said second information is reproduced.

BRIEF DESCRIPTION OF THE DRAWINGS

FIGS. 3(a) to 3(i) are schematic views showing recording surfaces of tapes in the individual steps.

FIG. 4 is a schematic view showing relative positions of individual blocks in a Japanese tape $J_c$, a noise tape $N_b$, and a Japanese tape $J_d$.

FIG. 5 is a schematic view showing recording surface of a prior art cassette tape.

DESCRIPTION OF THE PREFERRED EMBODIMENT

An embodiment of the present invention will now be described in detail with reference to the drawings.

Figure 1:
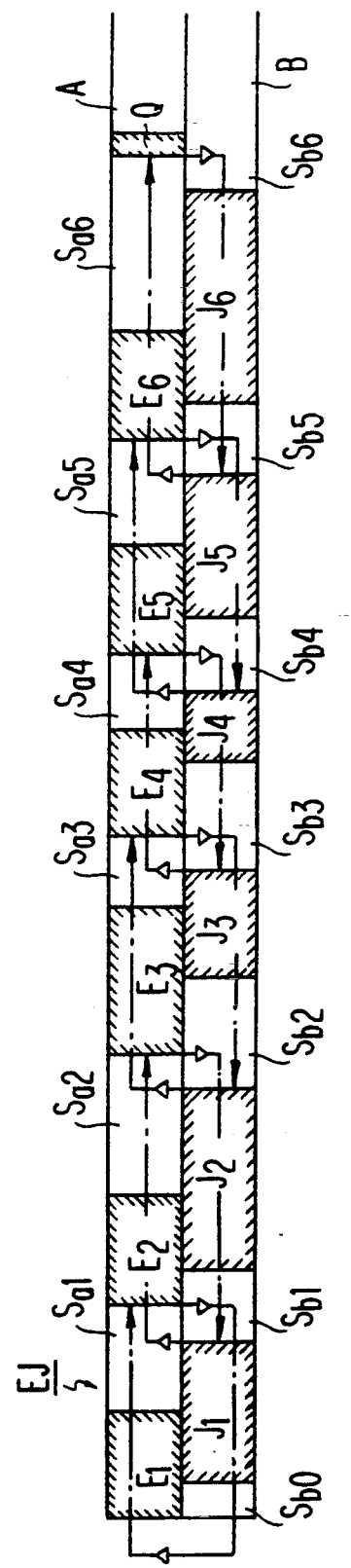
FIG. 1 is a schematic view showing recording surface of a cassette tape of an embodiment according to the present invention.

FIG. 1 is a schematic view showing a recording surface of a cassette tape of this embodiment according to the present invention. Referring to FIG. 1, EJ indicates the cassette tape of this embodiment, symbol A indicates a track A, symbol B indicates a track B, $E_1$-$E_6$ indicate English, and $J_1$-$J_6$ indicate Japanese. In this case, the Japanese $J_1$ is a translation corresponding to the English $E_1$. Similarly, the Japanese $J_2$-$J_6$ are translations of the English $E_2$-$E_6$ with corresponding suffixes. The English $E_1$-$E_6$ are reproduced when the cassette tape is moving in the left direction relative to a magnetic head in the figure, and the Japanese $J_1$-$J_6$ are reproduced normally when the cassette tape EJ is moving in he right direction relative to the magnetic head in the figure. Thus, the English $E_1$-$E_6$ are recorded from the left to the right in the figure, and the Japanese $J_1$-$J_6$ are recorded in the reverse direction. Symbol Q in the figure indicates a mark Q as a reference point for finding the beginning of the Japanese $J_6$.

As described above, in this embodiment, the English $E_1$-$E_6$ as a first information and the Japanese $J_1$-$J_6$ as a second information which are translations corresponding to the individual English $E_1$-$E_6$ are recorded on the track A and the track B, respectively, of the cassette tape as a magnetic recording medium.

The English $E_1$-$E_6$ and the Japanese $J_1$-$J_6$ Q comprise blocks which are delimited at adequate points for example, at ends of individual sentences. Parts of the track B at the lower side in the figure and the track A at the upper side in the figure of starting points of the individual blocks are always space sections $S_{a1}$-$S_{a6}$ and $S_{b0}$-$S_{b6}$ where no information is recorded. Thus, the parts of the track B and the track A corresponding to the starting points of the English $E_1$-$E_6$, the Japanese $J^1$-$J^6$ and the mark Q are always the space sections $S_{a1}$-$S_{a6}$ and $S_{b0}$-$S_{b6}$, and these space sections $S_{a1}$-$S_{a6}$ and $S_{b0}$-$S_{b6}$ are spaces immediately after the blocks recorded with information corresponding to each other with respect to the individual recording directions of the first and second information of the cassette tape EJ. For the English $E_3$ and the Japanese $J_3$, for example, the space section $S_{a3}$ corresponding to the starting point of the Japanese $J_3$ is the space section $S_{a3}$ immediately after the English $E_3$ with respect to the running direction, and the space section $S_{b2}$ corresponding to the starting point of the English $E_3$ is the space section $S_{b2}$ immediately after the Japanese $J_3$ with respect to the running direction.

Further, in this embodiment, parts of the track B and the track A corresponding to end points of the English $E_1$-$E_6$ and the Japanese $J_1$-$J_6$ are always positioned halfway the English $E_1$-$E_6$ and the Japanese $J_1$-$J_6$ corresponding to each other. By satisfying this condition, the length of the space sections $S_{a1}$-$S_{a6}$ and $S_{b0}$-$S_{b6}$ can be made always and necessarily smaller than the length of the blocks.

A stating point of a block is a position at which each information begins, that is, the left end of each block for the English $E_1$-$E_6$ and the mark Q, or the further end of each block for the Japanese $J_1$-$J_6$. An end point of a block is a position at which each information ends.

The cassette tape EJ of such configuration can be used in a cassette tape recorder having an auto-reverse function to reproduce the English $E_1$-$E_6$ and the Japanese $J_1$-$J_6$ repeatedly by the following operation.

For example, when to hear the English $E_2$ and then its translation, the English $E_2$ is reproduced from the track A and, at the beginning of the English $E_3$, a reverse key is operated to switch to the reproduction of the track B. As a result, first the space section $S_{b2}$ is reproduced and then the Japanese $J_2$ reproduced. After that, when the reproduction of the Japanese $J_2$ is complete and the beginning of the Japanese $J_1$ is found, the reverse key is operated to switch to the reproduction of the track A. By repeating the operation, the English $E_2$ and its Japanese translation $J_2$ can be heard again and again. The English $E_2$-$E_6$ and the corresponding Japanese translations $J_2$-$J_6$ can be heard using the same procedure as for the case of the English $E_2$ and the Japanese $J_2$. To hear the English $E_1$ and the Japanese $J_1$ and then return to the track A, the reverse key can be operated at the beginning of a margin section of the cassette tape EJ. To hear the English $E_6$ and then the Japanese $J_6$, the reverse key can be operated when the reproduction of the English $E_6$ is complete and the beginning of the mark Q is reached. Thus, by operating the cassette tape recorder so that a reproduction path (loops $L_1$–$L_6$) indicated by dot-bar lines in FIG. 1 is formed, the English $E_6$ can be heard in comparison with the Japanese $J_6$. Mark $\Delta$ indicates a position at which the reverse key is operated.

Method to use the cassette tape EJ of this embodiment is not specifically restricted, but a useful method is that the English $E_1$–$E_6$ are heard by reproducing the track A, and parts which are not understood of the meanings of the Japanese $J_1$–$J_6$ are heard selectively. This method allows very efficient learning of English conversation. In FIG. 1, the space sections $S_{a1}$–$S_{a6}$ are depicted long relative to the English $E_1$–$E_6$ as the information blocks for easy understanding, but in general, the space sections should preferably be as short as possible relative to the length of information sections. When the English $E_1$–$E_6$ are English conversation, the space section adequately has a length of about 2 to 3 seconds.

In addition to the combination of the English and the corresponding Japanese as in the above-described embodiment, possible combinations of the first information and the corresponding second information comprising a plurality of blocks include, but are not restricted to, the following.

| No. | First information | Second information |
| --- | --- | --- |
| 1 | Exercise problems | Points, equations |
| 2 | English news | Translated Japanese news |
| 3 | Questions | Answers |
| 4 | Computer programs | Data |
| 5 | Computer programs | Description of programs |
| 6 | Computer programs | Computer training |
| 7 | Data | Explaining sound |

Of the above combinations, the information configurations No. 1 to No. 3 are sound signals for both tracks A and B, as in the case of the above embodiment.

Of the above combinations, the information configurations No. 4 uses a binary signal representing the program and a binary signal representing data to be processed by the program. To use the configuration, the object program is loaded as in the case of the embodiment, and then the data is loaded on the other track, thereby loading a designed program and data corresponding to the program.

Of the above combinations, the information configurations No. 5 and No. 6 use binary signals representing programs and sound signals corresponding to the respective programs, and the information configuration No. 7 uses binary data and a sound signal corresponding to the data. The configurations No. 5 and No. 6 have the following features. Heretofore, manual for programs has been read and the programs have been loaded, however the above configurations allow description of the track B to be heard previously and to find the beginning of a corresponding program. Moreover, the configurations can eliminate the need for counting the position relations of the programs and, therefore, are ideal for recording a plurality of programs on a single information recording medium. The configuration No. 7 also provides the same effects.

Further, the information recording medium is not restricted to a cassette tape, but a magnetic disk that can be used in either forward or reverse rotation or an optical recording medium can also be used. The only requirement is that the positional relationship between the first information and the second information is as in the above-described embodiment.

Next, an embodiment of a method for preparing the recording surface of the cassette tape EJ shown in FIG. 1 will now be described in steps.

Figure 2A:
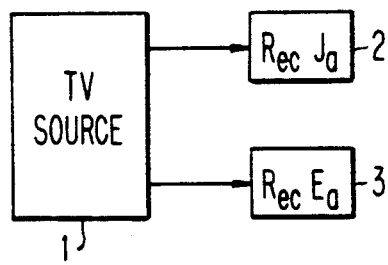
FIGS. 2(a) to 2(g) are block diagrams showing devices in individual steps of the embodiment for accomplishing the present invention.

(1) As shown in FIG. 2(a), cassette tape recorders (hereinafter referred to as tape recorders) 2 and 3 are connected to a sound source 1 of a television which can receive, for example, simultaneous broadcast of Japanese and English to record Japanese $J_1$–$J_6$ and English $E_1$–$E_6$.

As a result, a Japanese tape $J_a$ and an English tape $E_a$ recorded with the Japanese $J_1$–$J_6$ as shown in FIG. 3(a) and the English $E_1$–$E_6$ as shown in FIG. 3(b), respectively, are prepared.

Figure 2B:
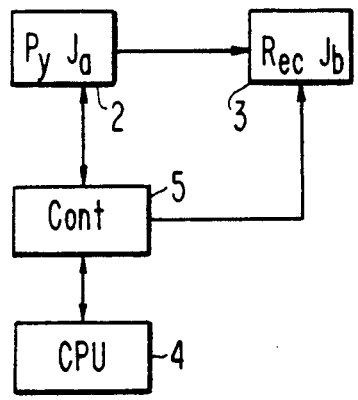

(2) As shown in FIG. 2(b), the tape recorder 2 is set to the reproduction mode and the tape recorder 3 is set to the recording mode to dub the Japanese $J_a$.

More specifically, a keyboard of a CPU4 is operated to start, through a control device 5, reproduction on the tape recorder 2 and recording on the tape recorder 3, and start dubbing of the Japanese tape $J_a$ into a virgin tape. Then, while hearing the reproduced sound of the Japanese tape $J_a$, the keyboard of the CPU4 is operated to stop operation of the tape recorder 2 when completion of each block si recognized, the stopping time is automatically measured by the CPU4, and reproduction on the tape recorder 2 is restarted automatically through the control device 5 after the passage of a predetermined stopping time. The same operation is repeated for every block of the Japanese tape $J_a$. In this case, the tape recorder 3 is driven continually in the recording mode.

As a result, a Japanese tape $J_b$ prepared on the tape recorder 3 has space sections $S_{b1-1}$–$S_{b5-1}$ between the blocks where the Japanese $J_1$–$J_6$ are recorded as shown in FIG. 3(b).

In this case, the period of time of each block is stored as time information in the CPU4.

Figure 2C:
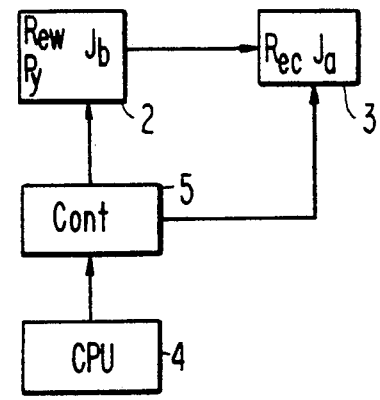

(3) As shown in FIG. 2(c), the tape recorder 2 is set to the rewinding reproduction mode and the tape recorder 3 is set to the recording mode to dub so that the individual blocks of the Japanese tape $J_b$ are arranged in the reverse order.

Specifically, first the keyboard of the CPU4 is operated to drive the tape recorder 2 in the rewinding reproduction mode nd, while hearing the reproduced sound, the Japanese tape $J_b$ is rewound from the rear side of the last block ($J_6$ in the figure) to the space section $S_{b5-1}$ at the front side of the block. Then, the keyboard of the CPU4 is operated to set the tape recorder 2 to the reproduction mode and the tape recorder 3 to the recording mode and drive both tape recorders simultaneously, while hearing the reproduced sound, the Japanese $J_6$ is dubbed into a virgin tape, and the tape recorders 2 and 3 are stopped at the time the block of the Japanese $J_6$ is passed.

By the same operation as above, the Japanese tape $J_6$ is rewound from the rear side of the Japanese $J_6$ block to the space section $S_{b4-1}$ at the front side of the Japanese $J_5$ block, and then the Japanese $J_5$ is dubbed by the same operation as above.

The same operation is repeated also for the Japanese blocks $J_4$–$J_1$.

As a result, a Japanese tape $J_c$ prepared on the tape recorder 3 has, as shown in FIG. 3(c), the Japanese $J_1$–$J_6$ arranged in the reverse order of the Japanese tape $J_b$, and adequate space sections $S_{b6\text{-}2}$–$S_{b1\text{-}2}$ before blocks recorded with the Japanese $J_6$–$J_1$.

The space sections $S_{b6\text{-}1}$–$S_{b1\text{-}2}$ normally differ in length from each other. Thus, the length is determined by how much the tape is rewound before each of the blocks recorded with the Japanese $J_1$–$J_6$ and then until how much after the block is recorded. As described above, the degree, when the Japanese tape $J_c$ is prepared by the key operation by the operator while hearing the reproduced sound, may be considered as large as from the rear end of the block before one block (in the figure, one of the Japanese $J_2$–$J_6$) of the Japanese tape $J_b$ to the front end of the block after that block.

In the case shown in FIG. 3(c), $S_{b6\text{-}2}$ --- $S_{b1\text{-}2}$ = $S_{b5\text{-}1}$ --- $S_{b1\text{-}1}$. This relation is achieved, for example, when the Japanese tape $J_b$ is rewound to the end of the block immediately before a block to be dubbed and stopped at the end of the block to be dubbed.

Figure 2D:
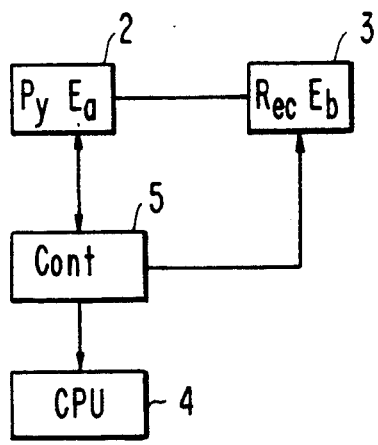

(4) As shown in FIG. 2(d), with the tape recorder 2 set to the reproduction mode and the tape recorder 3 set to the recording mode, the English tape $E_a$ is dubbed. This dubbing configuration is almost the same as in the case of (2) above.

More specifically, a keyboard of a CPU4 is operated to start, through a control device 5, reproduction on the tape recorder 2 and recording on the tape recorder 3, and start dubbing of the English tape $E_a$ into a virgin tape. Then, while hearing the reproduced sound of the English tape $E_a$, the keyboard of the CPU4 is operated to stop operation of the tape recorder 2 when completion of each block is recognized, the stopping time is automatically measured by the CPU4, and reproduction on the tape recorder 2 is restarted automatically through the control device 5 after the passage of a predetermined stopping time. The same operation is repeated for every block of the English tape $E_a$. In this case, the tape recorder 3 is driven continually in the recording mode.

The predetermined stopping time in this case, when difference between the length of time of each block of the Japanese $J_1$–$J_6$ and that of each corresponding block of the English $E_1$–$E_6$ are calculated and when (Japanese block)>(English block), a predetermined time added with the difference of time, or when (Japanese block-)<(English block), the predetermined time itself.

At the time when reproduction of the English block $E_6$ is complete and the predetermined time is passed, the mark Q is recorded.

The periods of time for individual blocks of the English $E_1$–$E_6$ and the mark Q are stored as time information in the CPU 4.

As a result, the English tape tape $E_6$ prepared on the tape recorder 3 has, as shown in FIG. 3(e), specified space sections $S_{a1\text{-}1}$–$S_{a6\text{-}1}$ between blocks recorded with the English $E_1$–$J_6$ and the mark Q. The space sections $S_{a1\text{-}1}$–$S_{a6\text{-}1}$ in this embodiment have lengths of spaces corresponding to the predetermined stopping time as 2 × $S_{b1\text{-}1}$ (=$S_{b2\text{-}1}$−$S_{b5\text{-}1}$) added with spaces (hatched parts in the figure) corresponding to the above-described differences between the English $E_1$–$E_6$ and the Japanese $J_1$–$J_6$.

Figure 2E:
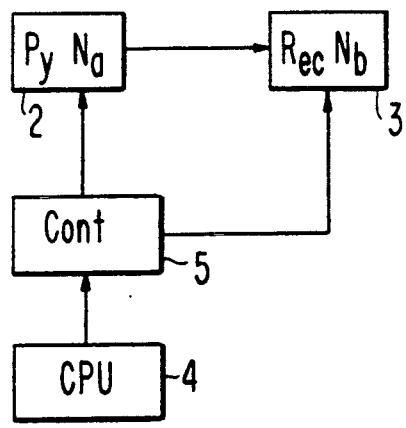

(5) As shown in FIG. 2(e), with the tape recorder 2 set to the reproduction mode and the tape recorder 3 set to the recording mode, a noise tape $N_a$ is dubbed to prepare a noise tape $N_b$ for monitoring which represents time relation in the reverse order of the individual blocks of the English tape $E_b$.

Specifically, the noise tape $N_a$, as shown in FIG. 3(f), is a tape recorded with continuous noises, which is prepared by repeating running and stopping of the noise tape $N_a$ by controlling the tape recorder 2 and continuously driving the tape recorder 3 in the recording mode. In this case, the noise tape $N_a$ is driven by controlling the tape recorder 2 so as, while reading the time information of the individual blocks of the English tape $E_b$ and the space sections $S_{a1\text{-}1}$–$S_{a6\text{-}1}$ stored in the CPU4 in the reverse direction of recording, to run at rear ends of the individual blocks recorded with the English $E_6$–$E_1$, that is, front ends of the space sections $S_{a6\text{-}1}$–$S_{a1\text{-}1}$, and to stop at front ends of the individual blocks, that is, rear ends of the space sections $S_{a6\text{-}1}$–$S_{a1\text{-}1}$.

As a result, the noise tape $N_b$ prepared by the taper recorder 3 is a tape in which the sections for the English $E_6$–$E_1$ of the English tape $E_b$ are noises and the space sections $S_{a6\text{-}1}$–$E_{a1\text{-}1}$ remain unchanged as space sections $S_{c6}$–$S_{c1}$.

Figure 2F:
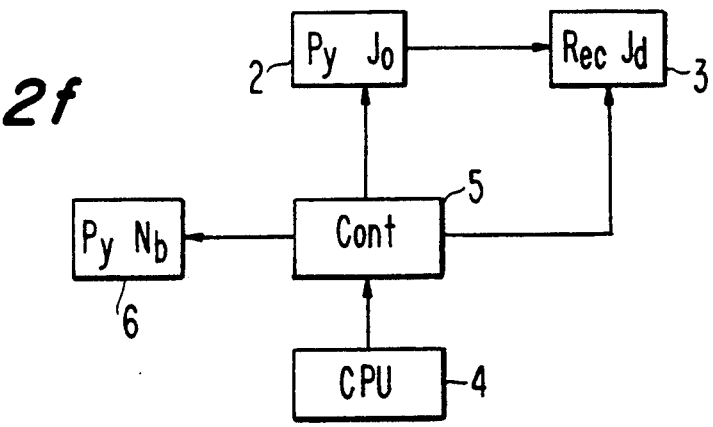

(6) As shown in FIG. 2(f), with tape recorders 2 and 6 set to the reproduction mode and the tape recorder 3 set to the recording mode and while monitoring the sound of the noise tape $N_b$, the Japanese tape $J_c$ is dubbed into a virgin tape.

Specifically, the keyboard of the CPU4 is operated to start simultaneously reproduction of the noise tape $N_b$ on the tape recorder 6 and recording of the Japanese tape $J_c$ on the tape recorder 2, the running of the Japanese tape $J_c$ is stopped when the Japanese tape $J_c$ is complete. Then, when noises corresponding to the English $E_b$ are complete, the Japanese $J_5$ is complete, the running of the Japanese tape $J_c$ is stopped.

After that, starting of the Japanese tape $J_c$ at the completion of noises corresponding to the English $E_5$–$E_2$ and stopping of the Japanese tape $J_c$ at the completion of the Japanese $J_4$–$J_1$ are repeated.

As a result, a Japanese tape $J_d$ prepared by the tape recorder 3, as shown in FIG. 3(h), has space sections $S_{b6}$–$S_{b1}$ before individual blocks recorded with the Japanese $J_6$–$J_1$.

In this embodiment, as described above, the noise tape $N_b$ is reproduced, and while hearing the reproduced sound, reproduction and stopping of the Japanese tape $J_c$ are controlled, but the preparation method for the Japanese tape $J_c$ is not restricted to that described above. When the English tape $E_b$ can be reproduced in the reverse direction, the sound reproduced by the reverse reproduction of the $E_b$ can be used in the same way as the reproduction of the noise tape $N_b$.

Figure 2G:
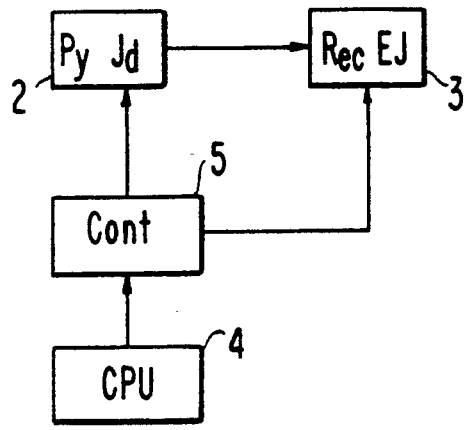

(7) As shown in FIG. 2(g), while reproducing the Japanese tape $J_d$ on the tape recorder 2, the reproduced sound is dubbed into track B of the English tape $E_b$ by the tape recorder 3.

More specifically, the English tape $E_b$ is rewindingly reproduced in the reproduction mode and when the sound of the mark Q pauses, that is, when the end position of the space section $S_{a6}$ of the English tape $E_b$ is reached, the rewinding reproduction is stopped, and the cassette of the English tape $E_b$ is reversed and set into the tape recorder 3. Then, the keyboard of the CPU4 is operated to start simultaneously reproduction of the Japanese tape $J_d$ by the tape recorder 2 and recording on the track B of the English tape $E_b$ by the tape recorder 3.

As a result, as shown in FIG. 3(i), the cassette tape EJ which is the same as shown in FIG. 1 is prepared.

The relationship between space sections $S_{b1\text{-}2}$-$S_{b6\text{-}2}$, $S_{c1}$-$S_{c6}$, and $S_{b1}$-$S_{b6}$ is considered.

FIG. 4 is a schematic view showing relative positions of the individual blocks of the Japanese tape $J_c$, the noise tape $N_b$, and the Japanese tape $J_d$.

As shown in FIG. 4, looking at each of blocks $BL_6$, $BL_5$, $BL_4$, $BL_3$, $BL_2$, and $BL_1$ from the recording start point of one block to the recording start point of the next block when preparing the Japanese tape $J_d$, there are formed at the heads of the individual blocks $BL_6$-$BL_1$, as indicated with dot-bar lines in the figure, space sections which are the space sections $S_{b6\text{-}2}$-$S_{b1\text{-}2}$ of the Japanese tape $J_c$ parallelly moved.

On the other hand, when block length of the Japanese $J_1$-$J_6$ > block length of the English $E_1$-$E_6$, space sections according to the difference between both are provided in the English tape $E_b$, as well as in the noise tape $N_b$. Thus, the space sections $S_{c6}$, $S_{c5}S_{c2}$, and $S_{c1}$ comprise predetermined space sections which are common to the space sections $S_{c6}$-$S_{c1}$, shown as unhatched space sections in the figure, added with space sections hatched in the figure. When block length of the Japanese $J_1$-$J_6$ < block length of the English $E_1$-$E_6$, space sections according to the difference between both are provided in the Japanese tape $J_d$. Thus, in the space sections $S_{b3}$ and $S_{b2}$, the hatched space sections are those according to the differences.

Therefore, in order to achieve the conditions that, in the individual blocks $BL_6$-$BL_1$, the Japanese $J_6$-$J_1$ and the English $E_6$-$E_1$ have the same length due to the addition of the differential space sections between both, and the right end of the Japanese $J_6$-$J_1$ in the Japanese tape $J_4$ in FIG. 4 and the right end of the English $E_6$-$E_1$ in the noise tape $N_b$ in the figure are present at righter side in the figure (this is essential for the cassette tape EJ to have the configuration as shown in FIG. 1)., the predetermined space sections of the space sections $S_{c6}$-$S_{c1}$ must be longer than the individual space sections $S_{b5\text{-}2}$-$S_{b1\text{-}2}$.

If, considering the above, the length of the predetermined space sections of a constant period of time in the space sections $S_{a1\text{-}1}$-$S_{a6\text{-}1}$ in the English tape $E_b$ is determined too long, spacings between blocks in the cassette tape EJ as the final product become too long.

In this embodiment, the lengths of the space sections $S_{b5\text{-}2}$-$S_{b1\text{-}2}$ depend on the skillness of the operators, and in general the lengths of the individual space sections $S_{b5\text{-}2}$-$S_{b1\text{-}2}$ are not same, however, in the worst case, it may be considered as the space sections $S_{b5\text{-}2}$-$S_{b1\text{-}2} = 2S_{b1\text{-}1} (= 2S_{b2\text{-}1} - S_{b6\text{-}1})$, and the length of the predetermined constant period space sections in the space sections $S_{b1\text{-}1}$-$S_{b6\text{-}1}$ can be determined sufficiently as large as twice that of the space sections $S_{b1\text{-}1}$-$S_{b6\text{-}1}$.

The above embodiment has been described for the cassette tape as an information recording medium. However, any kind of other information recording medium that can achieve the first embodiment may be used for the preparation of an information recording medium which allows repeated reproduction of corresponding two kinds of information in the same way.

As described above in detail with reference to the embodiments, with the present invention two types of corresponding information can be readily and repeatedly reproduced using a reproduction device having an auto-reverse function. In this case, even when there are a large number of information blocks, or even when one of the corresponding information blocks on one track and the other track is shorter and even when the difference in length between the corresponding information block is very large, the pair of the objective information blocks can be repeatedly reproduced.

I claim:

1. In a mutually and repeatedly reproducible information recording medium such as a magnetic tape in which, by running in one direction, first information recorded on a first track and, by running in the reverse direction, second information recorded on a second track corresponding to the first information, the improvement wherein:

(a) each of said first and second tracks has a series of sequential blocks where information is recorded, and space sections where no information is recorded separating the sequential blocks, the blocks on the first and second tracks corresponding sequentially to one another in their respective running directions, (b) each said block having a starting position and an end position in the respective running direction, the starting positions of each of the individual blocks on each of said tracks corresponding to a space section on the other track where no information is recorded, (c) said space sections between sequential blocks are space sections located immediately after blocks recorded with information corresponding to each other with respect to individual running directions for reproducing said information recording medium, and (d) the end position of each block on each said track is located intermediate the starting position and end of a block on the other track.

2. A mutually and repeatedly reproducible information recording medium as claimed in claim 1, wherein said first information and said second information are both sound signals, one being exercise problems, questions, or English expressed by sound and another being corresponding explanation of points, answers, or Japanese translations.

3. A mutually and repeatedly reproducible information recording medium as claimed in claim 1, wherein said first information is binary information representing computer programs and said second information is binary signals representing data to be processed by said programs.

4. A mutually and repeatedly reproducible information recording medium as claimed in claim 1, wherein said first information is binary information representing computer programs or data and said second information is sound signals of explanation or the like of said programs or data expressed by sound.

5. A mutually and repeatedly reproducible information recording medium as claimed in claim 1, wherein said information recording medium is a cassette tape of a magnetic recording medium.

6. A mutually and repeatedly reproducible information recording medium as claimed in claim 1, wherein said information recording medium is a magnetic disk rotatable in forward and reverse directions.

7. A mutually and repeatedly reproducible information recording medium as claimed in claim 1, wherein said information recording medium is an optical disk rotatable in forward and reverse directions.

* * * * *